United States Patent
Janoff et al.

(10) Patent No.: US 6,869,080 B2
(45) Date of Patent: *Mar. 22, 2005

(54) METAL-TO-METAL SEALING SYSTEM

(75) Inventors: Dwight D. Janoff, Missouri City, TX (US); John C. Vicic, Spring, TX (US); Gregory L. Glidden, Spring, TX (US); Neil C. Crawford, Spring, TX (US)

(73) Assignee: FMC Technologies, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/396,622

(22) Filed: Mar. 24, 2003

(65) Prior Publication Data

US 2003/0141671 A1 Jul. 31, 2003

Related U.S. Application Data

(62) Division of application No. 09/819,121, filed on Mar. 27, 2001, now Pat. No. 6,561,521.

(51) Int. Cl.$^7$ ................................................ F16L 21/05
(52) U.S. Cl. ........................ 277/603; 277/606; 277/607; 277/608; 277/609; 277/626; 277/627; 277/630; 277/650; 277/653; 285/334.2; 285/370; 285/917
(58) Field of Search ................................ 277/602, 603, 277/606.7, 607–609, 626–628, 630, 644, 650, 653; 285/370, 334.1, 334.2, DIG. 17

(56) References Cited

U.S. PATENT DOCUMENTS

| | | | | |
|---|---|---|---|---|
| 3,479,063 A | * | 11/1969 | Raver | 285/108 |
| 3,507,506 A | * | 4/1970 | Tillman, III | 277/614 |
| 3,797,835 A | * | 3/1974 | Wehner | 277/614 |
| 4,109,923 A | * | 8/1978 | Tuckmantel | 277/612 |
| 4,153,281 A | * | 5/1979 | Ahlstone | 285/146.3 |
| 4,470,609 A | * | 9/1984 | Poe | 285/334.2 |
| 4,471,965 A | * | 9/1984 | Jennings et al. | 277/322 |
| 4,550,936 A | * | 11/1985 | Haeber et al. | 285/26 |
| 5,944,319 A | * | 8/1999 | Kohlman | 277/314 |
| 5,984,370 A | * | 11/1999 | Lewis | 285/22 |
| 6,561,521 B2 | * | 5/2003 | Janoff et al. | 277/603 |

* cited by examiner

Primary Examiner—Anthony Knight
Assistant Examiner—Vishal Patel
(74) Attorney, Agent, or Firm—Henry C. Query, Jr.

(57) ABSTRACT

A metal-to-metal sealing element for a wellhead assembly which includes at least first and second adjacent components and first and second generally annular sealing surfaces that are each formed on a corresponding one of the components. The sealing element comprises an annular base, an annular sealing lip which projects radially toward at least one of the first and second sealing surfaces and which comprises a seal retaining groove, a soft metal sealing insert which is disposed within the seal retaining groove and which in use engages the at least one sealing surface, and an annular intermediate portion which extends between the base and the sealing lip. The intermediate portion presses the sealing insert against the at least one sealing surface in an interference fit relationship.

9 Claims, 4 Drawing Sheets

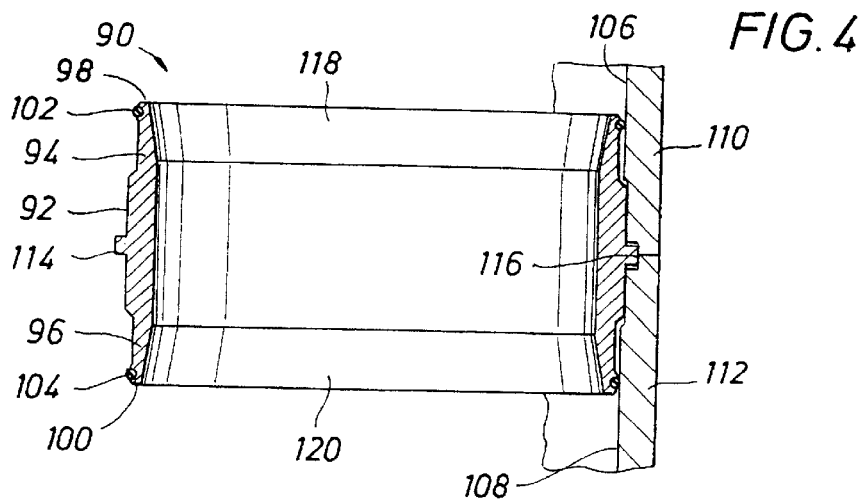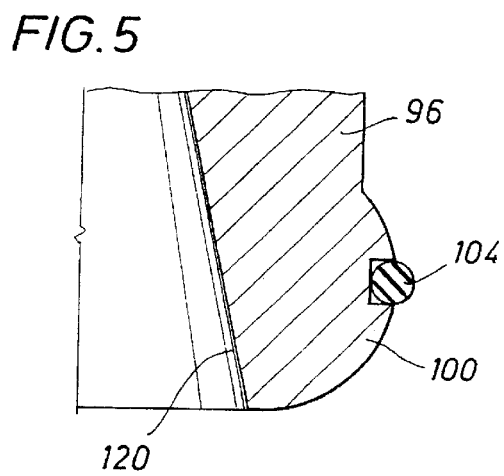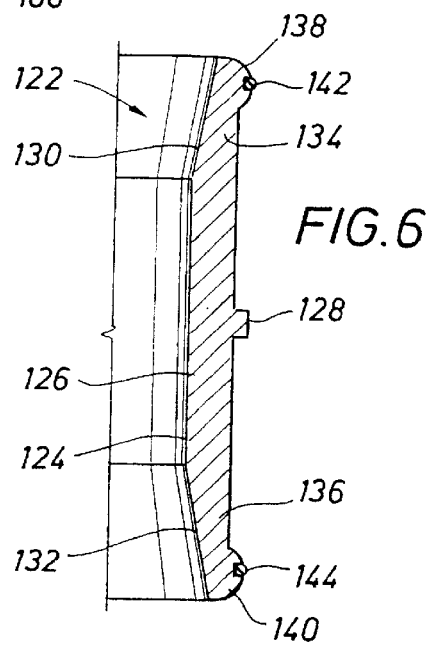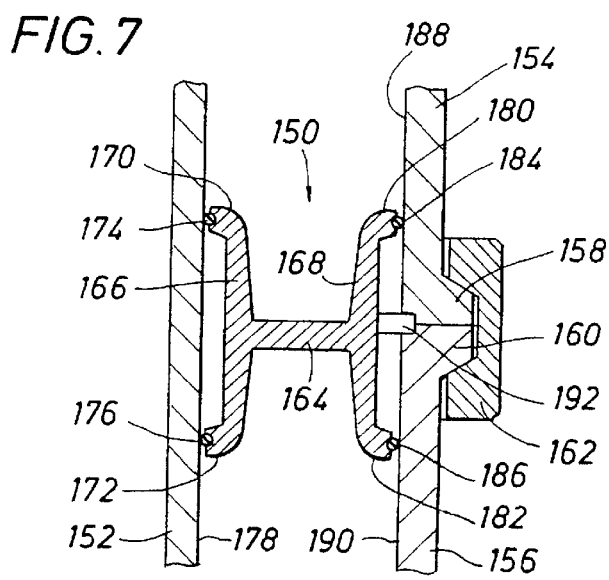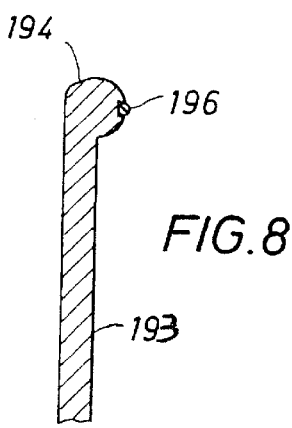

US 6,869,080 B2

1

METAL-TO-METAL SEALING SYSTEM

This application is a divisional of U.S. patent application Ser. No. 09/819,121, which was filed on Mar. 27, 2001 now U.S. Pat. No. 6,561,521.

BACKGROUND OF THE INVENTION

The present invention relates generally to an annular metal-to-metal sealing system for providing a fluid and pressure tight seal between two or more components of a wellhead assembly. More particularly, the present invention relates to an annular sealing assembly which includes a high strength seal carrier body to which is retained an annular seal insert that is composed of a soft, corrosion resistant metal which is sufficiently deformable by seal activating force of the seal carrier body to conform to the surface geometry and finish of a sealing surface and thus establish an efficient high pressure seal therewith.

Current rigid metal sealing technologies, such as Straight Bore Metal Seals ("SBMS"), Rough Casing Metal Seals ("RCMS"), FX Bonnet gaskets, and RX, BX and AX gaskets, require higher strength alloys to provide structural integrity and sealing force. These types of seals are widely used in gate valve bonnets, surface and subsea connectors, flow bores and generally throughout wellhead equipment. The strength requirements of these alloys can be up to 120,000 psi yield. These seals work by plastically deforming a small area into a smooth opposing surface. The seal contact area is generally small, and these seals are generally (with a few exceptions) not reusable. Often, due to corrosion requirements, high strength nickel alloys are selected for these seals. These seals may be sensitive to surface finish, installation damage and galling.

SUMMARY OF THE INVENTION

The present invention provides a high-pressure, metal-to-metal sealing system which employs a high strength metal seal body or carrier that facilitates application of spring energy or preload force to a soft metal insert carried by the seal body to accomplish high pressure metal-to-metal sealing even under conditions of poor surface finish or irregular sealing surface geometry. The present invention has application to rigid metal-to-metal seal technology including SBMS seals, RCMS seals, FX bonnet gaskets, RX, BX and AX gaskets and others. The concept of the invention involves separating the structural element (i.e., the seal body) from the sealing element (i.e., the soft metal insert). In such sealing systems, the soft metal insert may be installed by pressing, shrinking or other retention mechanisms on the higher strength seal body.

The higher strength seal body elastically deforms and provides a spring energy characteristic to activate the seal, plastically deforming the soft metal insert when installed. The high strength seal body also confines and protects the soft metal insert against pressure and mechanical abuse. This type of sealing system increases the contact area, allows lower alloy materials (such as 410 stainless steel or 8630 or 4130 steel) to be used for the body, prevents galling, and also allows the soft metal insert to be replaced, thus enabling reuse of the seal body. The soft metal insert will also accommodate wider machining tolerances and will seal against surfaces that have defects, such as scratches. This seal design may also be tolerant to slightly oval shaped seal bores.

The sealing concept of the present invention thus represents an improvement over metal seals that simply have a soft coating on the surface or require the soft metal to be welded to the high strength component. Coatings have limited wear/corrosion life and cannot fill large defects in the sealing area. In addition, welding the soft metal to the high strength component adds complexity, expense, and limits material selection and may preclude reuse of the seal.

So that the manner in which the above recited features, advantages and objects of the present invention are attained and can be understood in detail, a more particular description of the invention, briefly summarized above, may be had by reference to the preferred embodiment thereof which is illustrated in the appended drawings. It is to be noted however, that the appended drawings illustrate only a typical embodiment of this invention and are therefore not to be considered limiting of its scope, for the invention may admit to other equally effective embodiments.

BRIEF DESCRIPTION OF THE DRAWINGS

FIG. 4 is a sectional view of an annular seal body embodying the principles of the present invention;

FIG. 5 is a fragmentary sectional view of an end portion of the annular seal body of FIG. 4 showing an annular seal groove formed in an annular sealing projection or lip thereof and further showing a soft metal sealing element located within the annular seal groove;

FIG. 6 is a partial sectional view of an annular seal body having a soft metal sealing insert located in annular end grooves thereof and representing an alternative embodiment of the present invention;

FIG. 7 is a sectional view of an annular sealing assembly representing an embodiment of the present invention and having four annular sealing lips, each being provided with an annular soft metal sealing insert;

FIG. 8 is a partial sectional view of an annular seal body having a soft metal sealing insert located in an annular groove of an annular sealing lip having a generally circular or curved cross-sectional geometry;

DETAILED DESCRIPTION OF THE PREFERRED EMBODIMENTS

Figure 1:
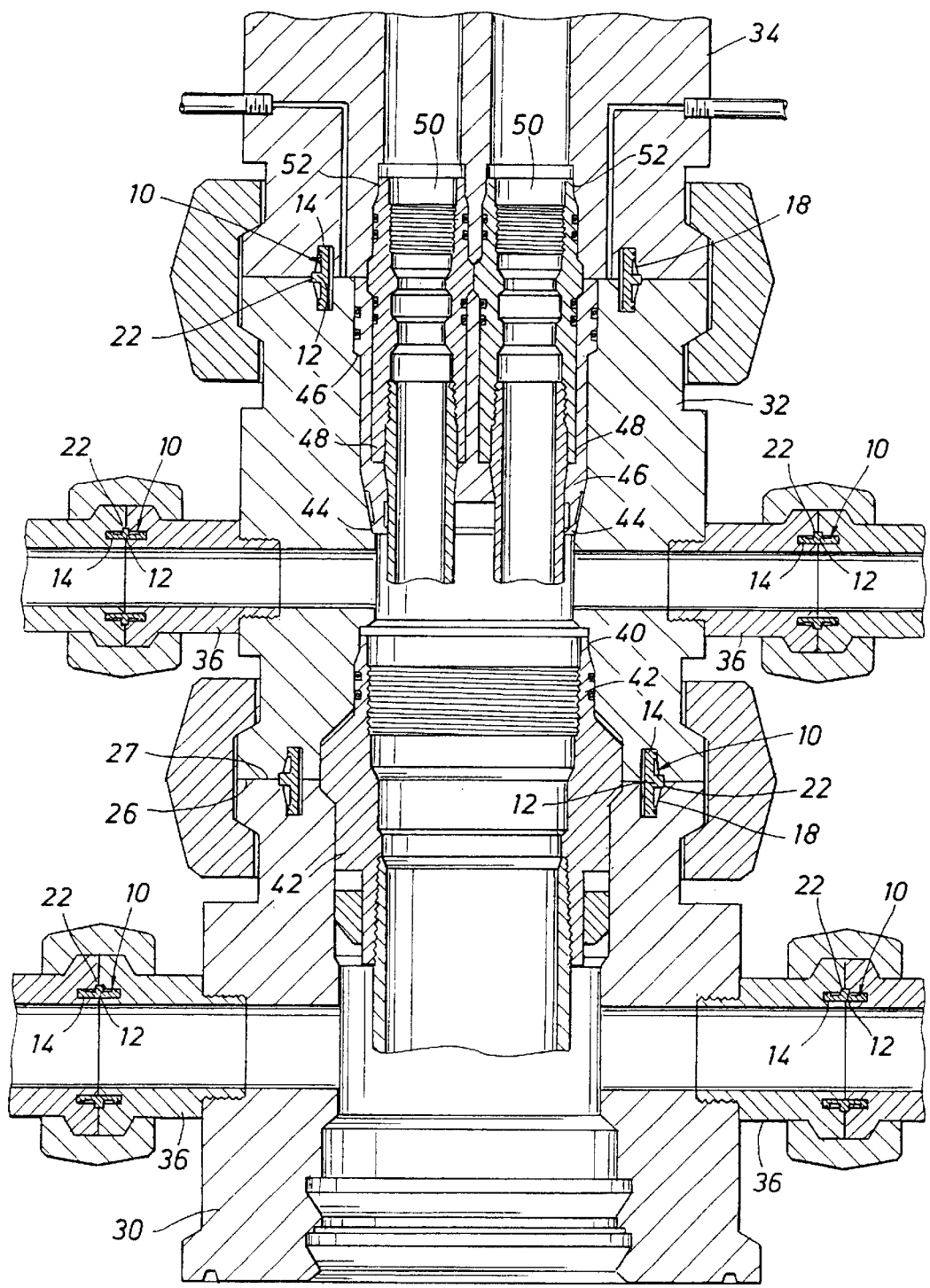
FIG. 1 is a fragmentary vertical section of a wellhead assembly for an oil or gas well, showing a number of uses of a metal-to-metal sealing system embodying the principles of the present invention.
Figure 2:
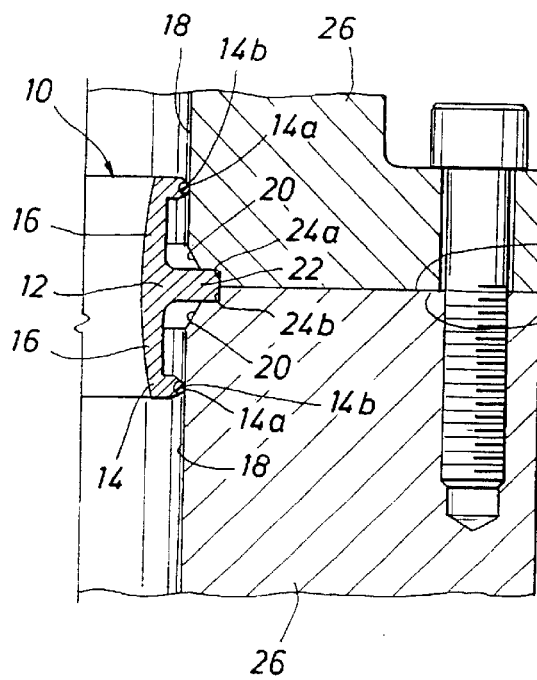
FIG. 2 is a fragmentary section, on an enlarged scale, of a metal-to-metal sealing system according to the present invention employed to provide a metal-to-metal seal between a valve bonnet and a valve body, or between two line flanges or other flanged annular elements.

Referring now to the drawings and first to FIGS. 1 and 2, a metal-to-metal sealing system embodying the principles of the present invention is shown to be provided for sealing a number of joints of a wellhead or conduit assembly. The metal-to-metal sealing system comprises an annular metal seal body element shown generally at 10 having an annular base portion 12 which defines at least one annular sealing lip 14 projecting radially toward and establishing metal-to-metal sealing engagement with an annular surface 18 which may be a tapered surface as shown in FIG. 1 or a cylindrical surface as shown in FIG. 2.

As is shown in greater detail in FIG. 2, the annular metal seal body 10 of the metal-to-metal sealing system has an annular soft metal sealing insert 14a, being supported within an insert groove of the annular sealing lip 14 and defining an annular sealing surface 14b. The annular sealing surface 14b may be of curved cross-sectional configuration, cylindrical cross-sectional configuration or any other suitable cross-sectional configuration without departing from the spirit and scope of the present invention. As is also shown in FIG. 2, the annular seal body of the metal-to-metal sealing system also defines one or more flexible annular intermediate portions 16 being integral with and extending from the annular base portion 12 and having the annular sealing lip 14 with its soft metal insert 14a projecting therefrom. The flexible annular intermediate portions 16 provide the annular seat body with a spring-like characteristic, so that the flexible annular intermediate portions 16 become flexed and thus preloaded during assembly and thus continuously urge the annular sealing lip with its soft metal insert against an annular sealing surface to maintain interference sealing therewith. The annular seal body 10 is adapted to be disposed in substantially concentric relation with a member 26, such as a tubular member of a wellhead assembly, which member defines at least one annular sealing surface 18 against which the annular sealing insert 14a is pressed in an interference fit relationship when the annular seal body is in functional position. A lead-in chamfer 20 on the cylindrical metal surface or wall 18 provides a means to install the annular metal seal body 10 into its illustrated functional position and to accomplish flexing and preloading of the annular seal body 10, and particularly its flexible annular intermediate portions 16, to ensure its spring-like forcible metal-to-metal sealing engagement with the cylindrical surface 18. The cylindrical surface 18 is designed to have an axial length that is adequate to ensure that the sealing face of the soft metal insert is always in metal-to-metal sealing contact with the annular surface 18 regardless of relative movement therebetween in response to temperature fluctuations or dimensional changes responsive to pressure. During assembly, the lead-in chamfer reacts with the soft metal seals 14a and the annular sealing projections to cause preloading of the intermediate sections 16 so that the intermediate sections become flexed for continuous application of spring force to the annular sealing lips 14 to maintain the soft metal sealing inserts of the annular sealing lips in interference sealing with the annular sealing surface 18 of the member 26.

In the embodiment shown in FIG. 2, the annular seal body 10 also has a central web portion 22 that extends radially from the base portion 12 to fit into relieved areas 24a and 24b in the adjacent faces 26a and 27a of annular flanges or other such structures defining the members 26, for properly positioning the annular seal body at the joint between the adjacent faces and ensuring its retention in that location. As shown in FIG. 1, the flanges or other structures defining the adjacent faces 26a and 27a can be components of a casing head 30, a tubing head 32, a block valve 34, an annulus outlets 36 or a wide variety of other structures where metal-to-metal sealing with internal or external annular surfaces is desired.

As further indicated in FIG. 1, the metal-to-metal sealing system of the present invention also can be utilized in a wellhead as (1) an annulus seal 40 between a mandrel casing hanger 42 and the tubing head 32, (2) a bushing seal 44 between an annular hanger bushing 46 and the tubing head 32, (3) an annulus seal 48 for tubing hanger couplings 50 in a dual tubing string completion system, and (4) an extended neck hanger seal as shown at 52.

Since the annular sealing face of the soft metal insert of the annular sealing lip is relatively narrow, may be of rounded cross-sectional configuration and is significantly softer than the cylindrical sealing surface, i.e., from about $\frac{1}{5}^{th}$ to about $\frac{1}{3}^{rd}$ the yield stress of the elastic component of the seal, it will not cause damage to the cylindrical sealing surface against which it is pressed when the annular sealing body is in functional position with respect to the cylindrical sealing surface. This small dimensioned sealing face also permits minor axial misalignment between the sealing element and the cooperative cylindrical surface to be accommodated, such as for example between a tubing hanger and the adapter element.

Tests on wellhead equipment utilizing a metal-to-metal sealing system having a soft metal sealing insert, according to the teachings of the present invention, have shown that the surface finish at the area of contact between the seal element and the cylindrical surface can be as rough as 125 microinches RMS, without jeopardizing the fluid tightness of the seal. This advantage contrasts significantly with the highly polished surfaces required in some other metal-to-metal sealing systems, and provides cost reduction opportunities in the manufacturing process. A seal that is an example of the described design passed both API PR2 and FMC 500 cycle endurance testing. Testing was done at 5000 psi between −75° F. and 450° F.

Additional advantages provided by the present invention include (1) the fact that the cylindrical configuration of the surface against which the sealing surface of the soft metal sealing element is pressed is substantially easier to manufacture than surfaces of other configurations, such as conical, heretofore employed in other metal-to-metal sealing systems, and (2) no special bolting or clamping arrangements are necessary.

Figure 3:
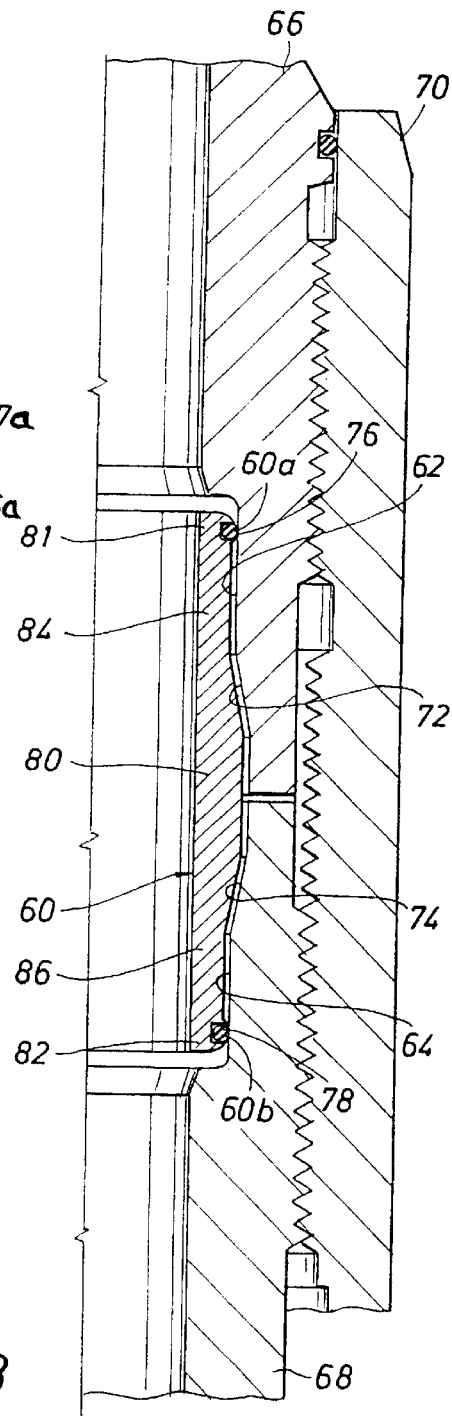
FIG. 3 is an enlarged fragmentary section of a metal-to-metal seal according to the present invention between two pipes interconnected by an external pipe coupling.

FIG. 3 illustrates a dual metal-to-metal seal system according to the teachings of the present invention, wherein an annular metal sealing element, shown generally at 60, is provided with two axially spaced outer circumferential annular sealing lips 60a and 60b being integral therewith and projecting radially outwardly therefrom. The sealing lips 60a and 60b are provided for metal-to-metal sealing engagement with annular inwardly facing annular sealing surfaces 62 and 64 of pipe ends 66 and 68 that are secured in assembly by an internally threaded pipe coupling 70. The internal end surfaces 62 and 64 of the pipe ends are of cylindrical configuration and are intersected by annular internal chamfered surfaces 72 and 74 which serve as lead-in chamfers during installation of the annular metal sealing element 60. The annular sealing lips 60a and 60b each define annular seal insert recesses receiving annular soft metal sealing inserts 76 and 78 which project from the respective seal insert recesses for sealing contact with the respective annular sealing surfaces 62 and 64. The annular metal sealing body 60, as shown in cross-section in FIG. 3, tapers from a relatively thick and substantially rigid generally cylindrical center section 80 to respective annular end sections 81 and 82 thereof so as to define flexible intermediate sections 84 and 86. The flexible intermediate sections are flexed radially inwardly as, during assembly, the annular sealing lips 60a and 60b and the soft metal inserts 76 and 78 traverse the chamfered surfaces 72 and 74 in progress to the cylindrical sealing surfaces 62 and 64. The force of assembly being applied to the flexible intermediate sections 84 and 86 of the annular seal body 60 causes radial flexing of the intermediate sections and thus causes the flexible intermediate sections to become spring loaded or preloaded. This feature enables the annular sealing lips and their soft metal inserts 76 and 78 to maintain interference sealing with the annular sealing surfaces 62 and 64 even though the respective pipe ends may change in dimension due to temperature changes, pressure changes, etc. Thus, the seal 60 employs a high strength, elastically deformable metal body to provide energizing force, and soft metal sealing inserts to provide the sealing mechanism. The soft metal of the annular sealing inserts allows for much higher sealing interference, and also permits effective sealing on a sealing or seating pocket surface that might have surface defects due to poor quality machining or surface damage.

Referring now to FIGS. 4 and 5, an annular sealing element embodying the principles of the present invention and being shown generally at 90, defines an annular body section 92 of generally cylindrical outer peripheral configuration and having intermediate flexible body sections 94 and 96 integral therewith. The intermediate body sections have annular sealing lips 98 and 100 projecting radially outwardly therefrom, and each sealing lip defines an annular seal insert groove. Annular soft metal sealing elements 102 and 104 are located within the respective annular seal insert grooves and project radially outwardly beyond the respective annular sealing lips 98 and 100 for sealing contact with respective annular sealing surfaces 106 and 108 of tubular elements 110 and 112. The annular seal body 92 is further provided with an annular outer peripheral web 114 which is received within an annular seal locating recess 116 that is cooperatively defined by the abutting ends of the tubular elements. The intermediate sections 94 and 96 are rendered more flexible as compared with the central section 92 by virtue of tapered end surfaces 118 and 120, thus permitting flexing and spring loading of the flexible intermediate sections by reaction with the internal surfaces of the tubular elements during assembly.

FIG. 6 illustrates a smooth bore metal seal shown generally at 122, having an annular seal body 124 defining a generally cylindrical center section 126 and having an annular seal locating web 128. The outer periphery of the annular seal body 124 is tapered from the central body section to the respective ends thereof as shown at 130 and 132, thus defining flexible intermediate sections 134 and 136. The respective axial ends of the annular seal body 122 each define annular sealing lips 138 and 140, each in the form of an annular sealing lip or projection having an annular sealing insert groove therein. Annular soft metal sealing inserts 142 and 144 are located within the respective annular seal insert grooves and project from the grooves, with an annular sealing portion thereof disposed for sealing engagement with an annular sealing surface of a tubular element or an annular sealing surface for which sealing is desired. The annular sealing lips 138 and 140 may have a curved or rounded cross-sectional configuration as shown, or in the alternative may define a more flattened annular surface in which the annular sealing insert is received. The annular sealing lips may also have any other suitable geometry, such as generally elliptical, triangular or rectangular, as desired, and the annular seal groove may have any suitable cross-sectional configuration, including generally rectangular as shown in FIG. 5, dove tailed or other undercut configuration to provide for retention of the annular soft metal sealing inserts.

FIG. 7 illustrates an annular sealing element shown generally at 150, which may be referred to as an "H" seal and which is useful for sealing with an internal cylindrical element 152 which is disposed in substantially concentric, spaced relation within abutting tubular members 154 and 156. Though not necessary, the tubular members are shown to have tapered connection flanges 158 and 160 that are retained in assembly by a clamp ring 162. The annular sealing element 150 defines a central web 164 to which is integrally connected a pair of annular seal body members 166 and 168. The annular seal body member 166 is of generally cylindrical configuration and defines annular sealing lips 170 and 172 at respective axial ends thereof. The annular sealing lips each define annular seal retention grooves having annular soft metal sealing elements 174 and 176 located therein for interference sealing with the outer cylindrical surface 178 of the internal cylindrical element 152. Likewise, the annular seal body member 168 is also of generally cylindrical configuration and defines annular sealing lips 180 and 182 each having annular seal retainer grooves defined therein and having annular soft metal sealing inserts 184 and 186 located within the respective seal grooves, with annular portions thereof projecting from the seal grooves and disposed in interference sealing engagement with the internal annular surfaces 188 and 190 of the pipe ends 154 and 156. An annular positioning web 192 projects radially from the central portion of the annular seal body member 168 and, in operative position, is located within an annular seal location recess that is cooperatively defined by the joint geometry of the abutting pipe ends 154 and 156.

The annular seal body members 166 and 168 are sufficiently flexible that they yield or flex typically during assembly of the annular seal 150 with the tubular member 152 and the pipe ends 154 and 156. Thus, when in sealing assembly, the annular seal body members apply continuous spring force to maintain the annular soft metal seal elements in interference sealing engagement with the respective annular surfaces. This feature enables the seal to maintain its effective sealing capability even though the annular members change in dimension due to temperature or pressure fluctuations. Also, the soft metal seal members will be deformed by the spring force and the force of assembly and will essentially fill surface imperfections of the cylindrical surfaces and achieve effective sealing. The soft metal seal members will also accommodate situations where the annular members are not of perfectly circular configuration since the soft metal seals will yield to accommodate such sealing surface irregularities.

In the partial sectional view of FIG. 8, an annular seal body 193 is provided with an annular sealing lip 194 which is of rounded or semi-circular cross-sectional configuration and projects radially from the annular seal body for sealing engagement with a cylindrical sealing surface, not shown. An annular soft metal seal member 196 is located within an annular seal retainer groove defined by the annular sealing lip and projects therefrom for interference sealing engagement with the cylindrical sealing surface.

Figure 9:
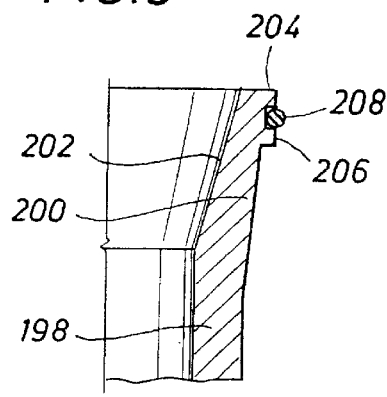
FIG. 9 is a partial sectional view of an annular seal body having a soft metal sealing insert located in annular sealing lip having an annular sealing face of substantially planar configuration.

In the partial sectional view of FIG. 9, an annular seal body 198 has a flexible tapered end section 200 defined by a chamfered surface 202. At the axial end of the tapered flexible end section is located an annular sealing lip 204 which projects radially from the annular seal body in a direction toward an annular surface. The annular sealing lip 204 is of generally rectangular cross-sectional configuration and defines a generally cylindrical or slightly curved outer peripheral surface 206. The annular sealing lip also defines an annular seal retention groove within which is located an annular soft metal seal insert 208. The annular seal retention groove may be of generally rectangular cross-sectional configuration as shown or may be of undercut cross-sectional configuration without departing from the spirit and scope of the present invention.

It should be borne in mind that the cross section of the soft metal insert for each of the embodiments of the invention set forth herein can be circular, elliptical, triangular, rectangular, or polygonal, and the seal grooves therefor may be of corresponding or differing cross-sectional configuration as desired. The soft metal sealing insert can be used, for example, on the sealing radii of RCMS seals, externally energized metal seals, and SBMS seals. Valve seats may be replaced with soft metal sealing inserts to minimize machining costs. Soft metal sealing inserts may also be used for ball valve seats, with no need to match lap the valve seat and ball to accomplish effective sealing. The sealing system of the present invention can be used for sealing on internal or external diameters with equal success. Also, seal designs can use multiple inserts (to increase contact area), or a single insert having a broad sealing surface. Existing seal designs can be modified efficiently and at low cost to accommodate the soft insert. Radial bumps of conventional metal-to-metal seals can be flattened and a groove added to simply fabrication of sealing components having soft metal sealing inserts.

Figure 10:
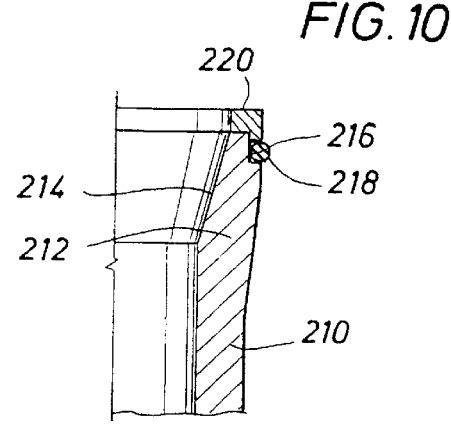
FIG. 10 is a partial sectional view of an annular flexible high strength metal seal body having a soft metal sealing insert located in an annular insert recess and being secured in assembly with the annular seal body by a retainer ring.

The partial sectional view of FIG. 10 illustrates an annular seal body structure 210 having at least one tapered flexible end section 212 which is defined by a chamfered surface 214 such as discussed above. The axial end or ends of the annular seal body define an annular seal recess 216 within which is located an annular soft metal seal element 218. A retainer ring 220, such as a snap ring, is received by the axial end of the annular seal body and serves to retain the soft metal sealing element 218 within the seal recess or groove. Thus, the annular soft metal seal is readily replaceable, so that the annular seal body can be reused even under circumstances where the annular soft metal seal might have become damaged during assembly, disassembly, or use.

Figure 11:
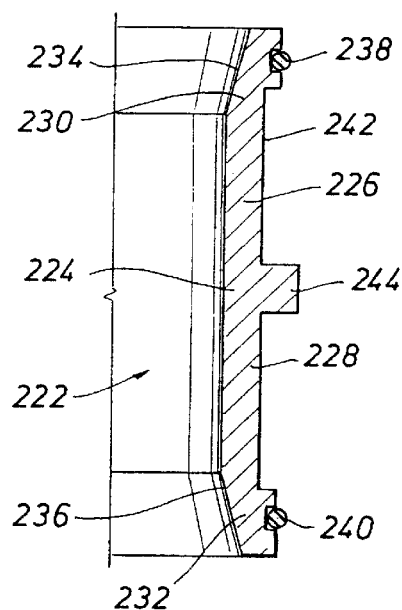
FIG. 11 is a partial sectional view of an annular flexible high strength metal seal body of generally cylindrical internal configuration and having a pair of soft metal sealing inserts located in annular insert grooves within respective extremities of the annular seal body.

Referring now to FIG. 11, the partial sectional view illustrates an annular seal body shown generally at 222, having a central body section 224 and intermediate body sections 226 and 228. Flexible axial end sections 230 and 232 of the annular seal body 222 are defined by annular chamfered surfaces 234 and 236. These flexible end sections are provided with annular seal retention grooves having soft metal sealing elements 238 and 240 retained therein. The soft metal sealing elements each define annular portions thereof which project radially beyond the annular surface 242 and establish interference sealing with an annular member. The annular surface 242 may be of cylindrical configuration and may extend completely to the axial ends of the annular seal body 222 as shown. In this case, the only portions of the seal assembly projecting radially beyond the cylindrical surface 242, except for an annular locator web 244, the purpose of which is explained above, are the sealing lips and portions of the soft metal sealing elements 238 and 240. During assembly of the annular seal body with annular surfaces, such as abutting pipe sections, the chamfered flexible axial ends of the annular seal body can be flexed by chamfered lead-in surfaces in the manner discussed above, to provide the annular seal body with preloaded spring-like characteristics upon assembly for continuous application of radially directed force to the annular soft metal seals to maintain them in interference sealing with the respective annular sealing surfaces contacted by the soft metal seals.

Figure 12:
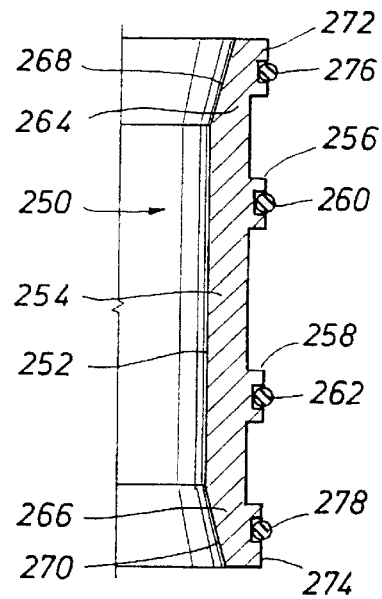
FIG. 12 is a partial sectional view of an annular flexible high strength metal seal body defining a plurality of internal annular sealing projections, ridges or bumps each defining an annular insert recess having an annular soft metal sealing insert retained therein for sealing engagement with a respective annular sealing surface.

FIG. 12 indicates that an annular sealing member shown generally at 250, embodying the principles of the present invention, may be provided with more than one or two annular soft metal sealing elements. The annular sealing member is defined by an annular seal body member 252 having a central body section 254 which defines circular sealing projections or lips 256 and 258 each defining an annular seal retainer groove having an annular soft metal seal element 260 and 262 located therein. The annular seal body is provided with flexible axial ends 264 and 266 which are defined by chamfered surfaces 268 and 270. These flexible axial ends also define annular projections or sealing lips 272 and 274 which have annular seal retention grooves containing annular soft metal seal members 276 and 278. Typically, the plurality of metal seal inserts of the annular sealing member 250 have the same internal or external dimension, so that multiple seals can be established on a cylindrical surface to enhance the sealing capability of the annular sealing unit. If desired, however, the intermediate seals and the axial end seals or each of the seal inserts may be of differing dimension according to the geometry of the surface or surfaces to be sealed. The annular seal member 250 is especially adaptable for use as a SBMS seal, with the plurality of annular soft metal seal inserts thus enhancing the surface contact that is ordinarily possible when seals are used having only one or two soft metal seal inserts.

Figure 13:
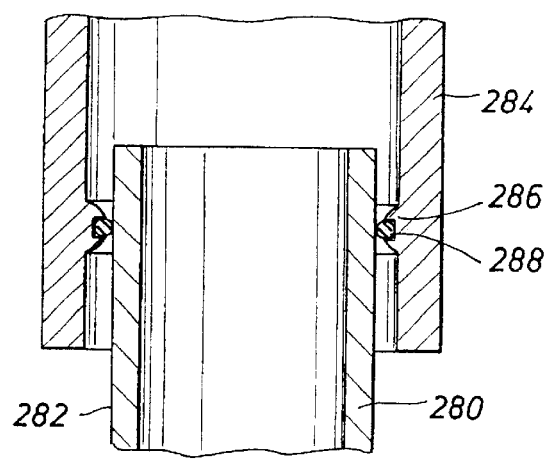
FIG. 13 is a fragmentary sectional view of an annular flexible high strength metal seal body having an annular internal sealing projection defining an annular seal recess containing an annular soft metal sealing insert and with the sealing insert shown in sealing engagement with an annular external sealing surface of a tubular member disposed in telescoping relation with the annular metal seal body.

As shown in FIG. 13, sealing according to the teachings of the present invention may be accomplished between telescopically arranged tubular elements. A tubular element 280 having a cylindrical external surface 282 is shown to be telescopically received within a tubular member 284. To accomplish sealing, the outer tubular member defines an internal annular sealing projection or lip 286 having an annular seal retention groove 288. An annular soft metal seal is retained within the annular seal retention groove, with an annular portion thereof projecting radially beyond the annular sealing projection 286 and thus disposed for sealing engagement with the outer cylindrical surface 282 of the tubular element 280. It should be borne in mind that the annular sealing lip may, in the alternative, be located at the outer periphery of the inner tubular element, causing the soft metal seal to be positioned for sealing engagement with the inner cylindrical surface of an outer tubular member.

As will be readily apparent to those skilled in the art, the present invention may easily be produced in other specific forms without departing from its spirit or essential characteristics. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

What is claimed is:

1. In combination with a wellhead assembly which includes at least first and second adjacent components and first and second generally annular sealing surfaces that are each formed on a corresponding one of the components, a metal-to-metal sealing element comprising:

an annular base;

an annular sealing lip which projects radially toward at least one of the first and second sealing surfaces and which comprises a seal retaining groove;

a soft metal sealing insert which is disposed within the seal retaining groove and which in use engages the at least one sealing surface; and an annular intermediate portion which extends between the base and the sealing lip;

wherein the intermediate portion presses the sealing insert against the at least one sealing surface in an interference fit relationship.

2. A wellhead assembly according to claim 1, wherein at least one of the first and second components includes a frusto-conical surface intersecting the sealing surface, and wherein the frusto-conical surface functions as a lead-in chamfer for installation of the sealing element.

3. A wellhead assembly according to claim 1, wherein the sealing element comprises a plurality of sealing lips, each of which is connected to the base by a corresponding intermediate portion and each of which includes a seal retaining groove within which a soft metal sealing insert is disposed for metal-to-metal sealing engagement with at least one of the first and second sealing surfaces.

4. A wellhead assembly according to claim 3, wherein the sealing element comprises two sealing lips, each of which is positioned opposite a corresponding one of the first and second sealing surfaces.

5. A wellhead assembly according to claim 4, wherein the sealing element further comprises a web portion intermediate the sealing lips to locate and retain said sealing element in functional position with respect to the first and second sealing surfaces.

6. A wellhead assembly according to claim 3, wherein the first and second components are arranged concentrically relative to each other and wherein the sealing element comprises a generally U-shaped cross-sectional configuration and inner and outer sealing lips, each of which includes a seal retaining groove within which a soft metal sealing insert is disposed for metal-to-metal sealing engagement with the first and second sealing surfaces.

7. A wellhead assembly according to claim 3, wherein the first and second components are arranged coaxially relative to each other and wherein the sealing element comprises a generally step-shaped cross-sectional configuration and inner and outer sealing lips, each of which includes a seal retaining groove within which a soft metal sealing insert is disposed for metal-to-metal sealing engagement with the first and second sealing surfaces.

8. A wellhead assembly according to claim 3, further comprising a third component which includes a corresponding third sealing surface, and wherein the sealing element comprises a generally H-shaped cross-sectional configuration and at least three sealing lips, each of which includes a seal retaining groove within which a soft metal sealing insert is disposed for metal-to-metal sealing engagement with the first, second and third sealing surfaces.

9. A wellhead assembly according to claim 8, further comprising a fourth component which includes a corresponding fourth sealing surface, and wherein the sealing element comprises four sealing lips, each of which includes a seal retaining groove within which a soft metal sealing insert is disposed for metal-to-metal sealing engagement with the first and second sealing surfaces.

* * * * *